Sept. 19, 1950 L. D. LA FLAMME 2,523,032

TUNING MECHANISM

Filed March 24, 1948

Inventor:
Louis D. LaFlamme,
by Merton D. Morse
His Attorney.

Patented Sept. 19, 1950

2,523,032

UNITED STATES PATENT OFFICE 2,523,032

TUNING MECHANISM

Louis D. La Flamme, Bridgeport, Conn., assignor to General Electric Company, a corporation of New York Application March 24, 1948, Serial No. 16,830

2 Claims. (Cl. 74—10.8)

This invention relates to tuning mechanisms and more particularly to a direct, positive, gear drive tuning mechanism for use in radio systems and the like.

It is an object of this invention to provide a gear drive tuning mechanism for use in radio apparatus and the like which simulates the tuning sensation of conventional mechanisms of the cord drive type, but which obviates the disadvantages of such conventional mechanisms.

It is a further object of this invention to provide a tuning mechanism for radio apparatus and the like in which slippage is eliminated when the moving element of the tuned unit is in motion, and in which life-long service is insured.

Yet another object of this invention is to provide such a direct gear drive tuning mechanism in which friction means are incorporated which provides a slipping action in the mechanism when the moving element of the tuned unit reaches the end of its travel.

Still a further object of this invention is to provide such an improved tuning mechanism which may be readily adapted to conventional radio apparatus tuning arrangements.

Figure 2:
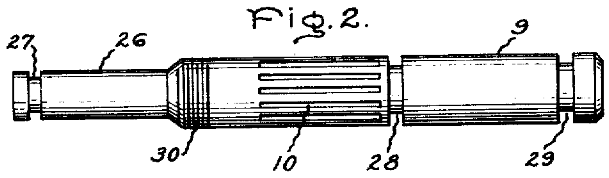
Figure 3:
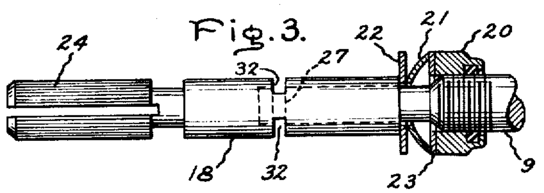
Figure 4:
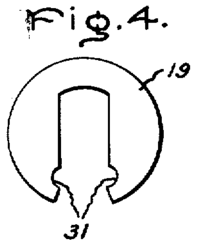

The features of this invention which are believed to be new are set forth with particularity in the appended claims. The invention itself, however, together with further objects and advantages thereof may best be understood by reference to the accompanying drawing in which Fig. 1 shows the proposed tuning assembly, and Figs. 2, 3 and 4 show various components of the assembly of Fig. 1.

Figure 1:
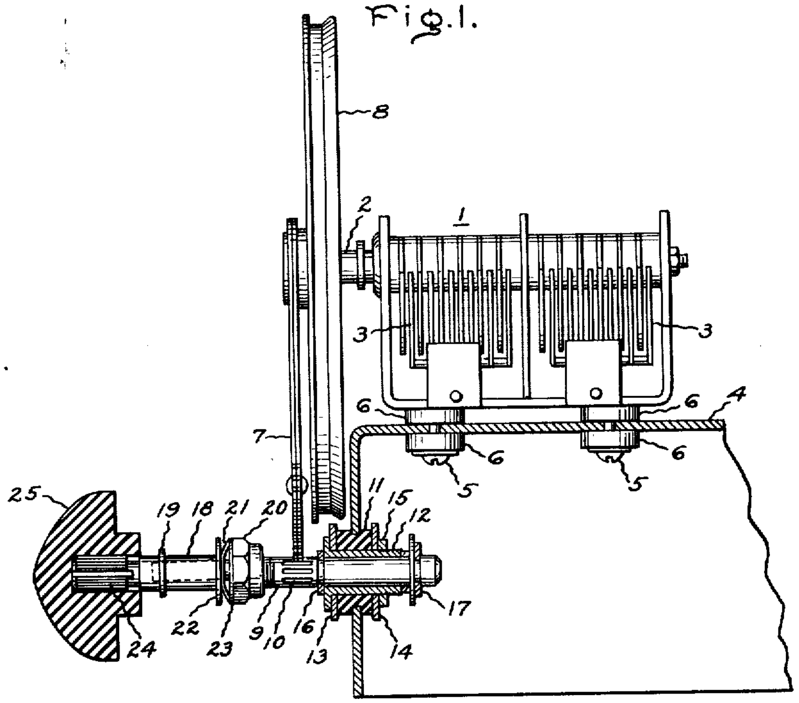

Referring now to Fig. 1, there is shown generally at 1 a tuning unit for radio apparatus and the like, in this instance the tuning unit is shown as a pair of mechanically coupled variable capacitors. Capacitor unit 1 comprises a rotor mounted on a shaft 2 and stators 3, the unit being mounted on chassis 4 of the apparatus by means of screws 5 and rubber grommets 6. A conventional dial drum 8 is mounted on shaft 2, and this drum has an anti-backlash, spring loaded split sector gear 7 mounted thereon. The drum 8 activates the usual dial pointer, not shown.

Means are provided, in accordance with the invention, for driving sector gear 7 and hence shaft 2, this means including shaft 9 and a pinion rigidly fixed thereto and engaging gear 7. The pinion may be formed in the manner shown in the illustrated embodiment in which teeth 10 are milled into the shaft 9 itself, these teeth engaging gear 7 and driving this gear and hence rotor shaft 2.

Shaft 9 is rotatably mounted on chassis 4 and insulated therefrom by means of rubber grommet 11. A bushing 12 is mounted in grommet 11 and flat washers 13 and 14 are placed on either side of the grommet. The mounting assembly is held in place by a bushing nut 15, and the flat washers 13 and 14 serve to force grommet 11 into a rigid support for bushing 12 when bushing nut 15 is tightened. Hence, a rigid mounting for shaft 9 is provided which also serves to insulate this shaft from chassis 4. Shaft 9 is held securely in the mounting by means of clips 16 and 17, which may take the form of flat C washers clipped into suitable notches in shaft 9, these notches being shown as 28 and 29 in Fig. 2.

A hollow shaft 18 is mounted concentrically to and is adapted to receive one end of shaft 9 to provide a driving means therefor, torque being transmitted from shaft 18 to shaft 9 by means of a spring washer 21 and a C washer 19 which frictionally engages notches in shafts 9 and 18 and limits axial movement of shaft 18 relative to shaft 9. The torque exerted on shaft 9 by shaft 18 by way of C washer 19 and spring washer 21 may be adjusted by adjusting elastic nut 20, this nut being fixed to shaft 9 by means of threads formed therein. Adjustment of nut 20 changes the tension of spring washer 21, this washer being mounted between two flat washers 22 and 23. Flat washer 22 bears against the end of shaft 18, and hence adjustment of nut 20 changes the torque transmitted from shaft 18 to shaft 9 by way of C washer 19 and spring washer 21.

One end of shaft 18 is knurled as shown at 24 so that the usual spline type knob 25 may be fixed to this shaft. Rotation of knob 25 causes shaft 18 to rotate, and rotation of this shaft is transmitted to shaft 9 through C washer 19 and spring washer 21. Shaft 9 in turn drives sector gear 7 by means of teeth 10 which engage this gear and gear 7 rotates shaft 2, changing the position of the rotor of capacitor unit 1. The C washer 19 and spring washer 21 may be adjusted by nut 20 to allow for a torque of any amount, and hence positive action of the mechanism, while the rotor is in travel, may be maintained. When the rotor reaches the end of its travel, C washer 19 slips in the notch in shaft 9 and spring washer 21 slips between washers 21 and 23 for any torque adjustment of nut 20.

Fig. 2 shows the shaft 9 in greater detail. Referring now to Fig. 2, the shaft 9 has a portion 26 which is reduced in diameter and inserted in shaft 18 of Fig. 1. The reduced portion 26 has a notch 27 formed therein for receiving the C washer 19 of Fig. 1. Further notches 28 and 29 are formed in shaft 9 which receive clips 16 and 17 respectively. Elastic nut 20 of Fig. 1 is mounted on screw thread 30 of this shaft, and gear teeth 10 engage gear 7, as previously described.

Fig. 3 shows shaft 18 with the reduced portion 26 of shaft 9 inserted therein. Shaft 18 has two transverse notches 32 formed therein to receive the C washer 19 of Fig. 1.

The C washer 19 is shown in more detail in Fig. 4. This washer is so shaped that, when in place, it engages notches 32 and 27 of shafts 18 and 9 respectively, and clips to shaft 18 by means of notches 31 formed in the washer.

Although a particular form of slip-clutch between shafts 18 and 9 has been shown and described, it is obvious that the invention is not limited thereto, as any of the many known types of such clutches may be used.

This invention, therefore, provides a positive gear drive tuning device that retains all the advantages of the conventional cord drives, and yet precludes the disadvantages of wear and slippage which are present in such conventional drives.

While a certain specific embodiment has been shown and described, it will, of course, be understood that various modifications may be made without departing from the invention. The appended claims are therefore intended to cover any such modifications that fall within the true spirit and scope of the invention.

What I claim as new and desire to secure by Letters Patent of the United States is:

1. A tuning mechanism for radio apparatus and the like comprising a first shaft member, a second shaft member having a hollow sleeve portion adapted to fit over said first shaft member, said first shaft member and said hollow sleeve portion having aligned notches therein, retaining washer means positioned within said notches so as loosely to couple said first and second shaft members, frictional slipping means for transmitting motion from said second shaft member to said first shaft member, said last named means including spring washer means positioned on said first shaft and adapted to exert endwise pressure on said second shaft thereby to urge said second shaft against said retaining washer means, a tuning unit having a movable element, gear means driving said movable element, and means including said first shaft member for driving said gear means, said frictional slipping means providing positive drive in said mechanism during the travel of said movable element.

2. A tuning mechanism for radio apparatus and the like comprising a first shaft member, a second shaft member having a hollow sleeve portion adapted to fit over said first shaft member, said first shaft member and said hollow sleeve portion having aligned notches therein, retaining washer means positioned within said notches so as loosely to couple said first and second shaft members, frictional slipping means for transmitting motion from said second shaft member to said first shaft member, said last named means including spring washer means positioned on said first shaft and adapted to exert endwise pressure on said second shaft thereby to urge said second shaft against said retaining washer means, a tuning unit having a movable element, gear means driving said movable element, means including said first shaft member for driving said gear means, and adjustable means included in said frictional slipping means for providing positive drive in said mechanism during the travel of said movable element.

LOUIS D. LA FLAMME.

REFERENCES CITED

The following references are of record in the file of this patent:

UNITED STATES PATENTS

| Number | Name | Date |
|---|---|---|
| 1,266,280 | Kocourek | May 14, 1918 |
| 1,566,069 | Buchholz et al. | Dec. 15, 1925 |
| 1,854,608 | Burger | Apr. 19, 1932 |
| 2,177,760 | Wheat | Oct. 31, 1939 |
| 2,362,592 | Spiller | Nov. 14, 1944 |